April 1, 1952   C. G. HARD AF SEGERSTAD ET AL   2,591,255
APPARATUS FOR MEASURING HIGH PRESSURES
Filed Dec. 23, 1946   2 SHEETS—SHEET 1
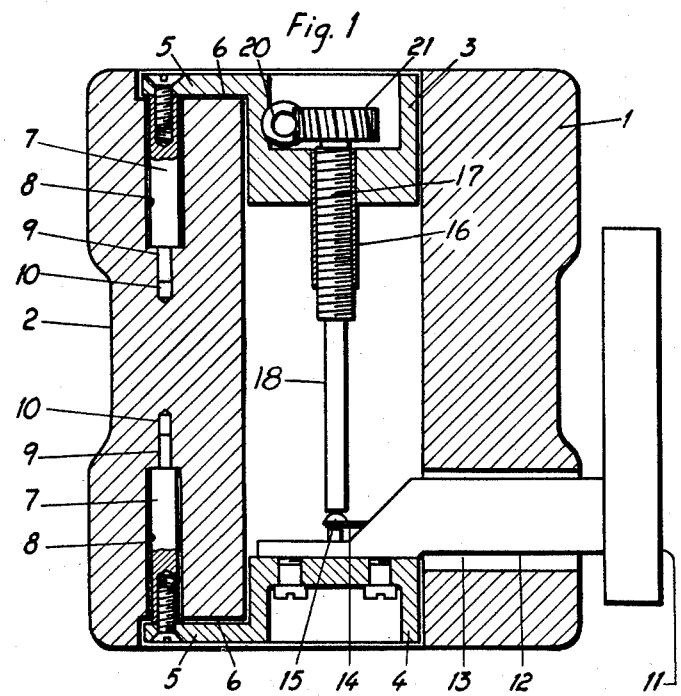
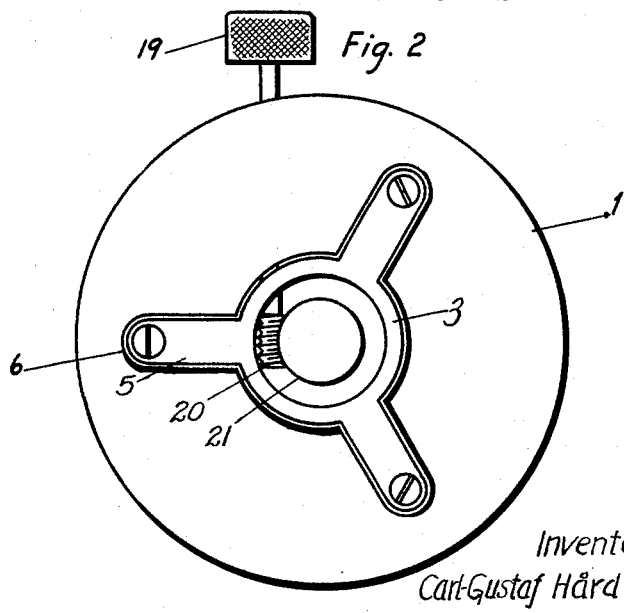
Inventors:
Carl-Gustaf Hård af Segerstad.
John-Erik Magnusson
by W. Bayard Jones
Attorney.

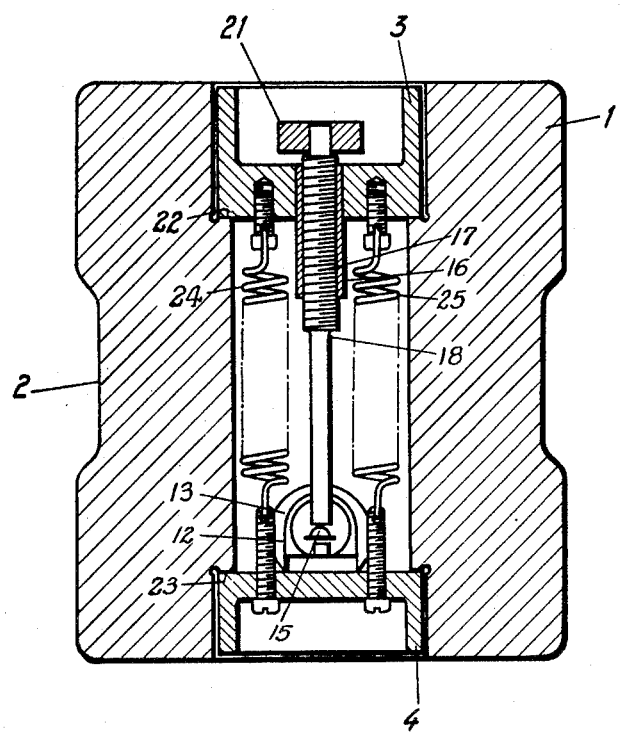

Patented Apr. 1, 1952

2,591,255

UNITED STATES PATENT OFFICE 2,591,255

APPARATUS FOR MEASURING HIGH PRESSURES

Carl Gustaf Hård af Segerstad and John-Erik Magnusson, Sandviken, Sweden, assignors to Aktiebolaget C. E. Johansson, Eskilstuna, Sweden, a company of Sweden Application December 23, 1946, Serial No. 717,990
In Sweden March 3, 1945

6 Claims. (Cl. 73—141)

The present invention relates to a measuring apparatus for measuring high pressures, particularly static pressures, that is to say, constant pressures or comparatively slow-varying pressures. The apparatus is of the type by means of which a measure of the pressure or force is obtained by measuring the change of dimension which a body of steel or other resistant though sufficiently elastic material suffers due to compression caused by the pressure or force acting on the body. It has been proposed to construct the said body in the shape of a cylinder having a central bore projecting into the cylinder from one end thereof, but the other end of which is closed and is thus provided with a closure portion or head made integral with the remainder of the cylinder. The force to be measured was allowed to act upon the cylinder in the axial direction thereof, and by means of a length measuring instrument associated with the body, the compression or change of dimension was measured in the direction of the axis of the cylinder between the said head at one end thereof and some point at the other end of the cylinder. It has been found, however, that this prior construction of the apparatus suffers from certain disadvantages in as much as the measured change of dimension is not solely dependent upon the compression of the material in the axial direction of the cylinder, but the measuring result is also influenced by the inward flexure or other change of shape of the head. For this reason the said prior construction of the apparatus does not satisfactorily ensure the desired and required linear and univocal relation between the pressure load on the cylinder and the change of dimension measured.

This disadvantage is eliminated, according to the present invention, by the said body, which may suitably be cylindrical, being provided with an axial hole or bore passing through said body from end to end thereof, so that the body consists of a tubular body, and by the measuring instrument cooperating with points which are located in the wall of the tubular body intermediate the through axial hole or bore and the outer circumferential surface of the body. Accordingly, the abovementioned integral head of the body used in prior constructions is entirely done away with. The construction according to this invention provides the advantage that the change of dimension which is transmitted to and measured by the measuring instrument, consists exclusively of a compression of the material in the body in the direction of the pressure acting on the body.

A body which is actuated by a force, however, is not absolutely sure to change its dimensions to the same extent in all directions, and for this reason it is preferred, in the measuring apparatus according to the present invention, as in the prior apparatus, to measure the change of dimension in the central or axial line of the body, which is parallel to the direction of the force acting on the body, in order to obtain, as far as possible, and to measure the average value of the change of dimension of the body in the direction of the force. With this object in view the measuring apparatus according to this invention is provided at each end of the body with cross beams or bridging members located inside the end surfaces of the body and in the transverse direction to the direction of force, i. e. to the axis of the body, said beams or bridging members bearing against abutments in the body, and the measuring instrument cooperates with points on said members which lie on the axis of the body. The points at which the said bridging members bear against or are supported by the body, are preferably located at equal radial distances from the axis of the body. Upon compression of the body due to the force acting on the same the said beams or bridging members will take part in the movement at their points of support in or attachment to the body due to the compression thereof, and therefore, the change of dimension between the center points of the two beams or bridging members will provide an average value of the changes of dimension at the said points of support or attachment of the beams or bridging members.

It is well known that when a body is compressed, it changes its shape not only in the direction of the pressure but also in other directions, such as its transverse direction. With a view to avoid the fact that such changes of the shape of the body will influence the measuring result, the present invention also provides the improvement that the abovementioned beams or bridging members are movable to a certain extent relatively to the body in the transverse direction thereof. According to a preferred embodiment of this arrangement, the ends of the beams or bridges are attached to or supported by pins which are preferably parallel to the axis of the body, and which are directed from the beams or bridging members inwards towards the transverse central plane of the body, and the inner ends of which pins bear against abutments in the body. The outer ends of the pins can thus undergo a slight movement relatively to the inner ends of the pins in the transverse direction of the body, sufficient to produce the required freedom of motion of the beams or bridging members relatively to the body in the transverse direction thereof. With this lastmentioned arrangement the measuring instrument will, of course, measure the change of dimension of that portion of the body which is located intermediate the said abutments in the body. According to the invention, therefore, the said portion of the body is preferably constructed with a smaller cross sectional area than the remainder of the body, so that a relatively large portion of the compression caused by the force shall take place within the said portion of the body.

The provision of beams or bridging members, according to this invention, for transmitting the movement resulting from the change of dimension of the body, to the measuring instrument, also provides the advantage that the measuring instrument can be easily attached to the body in a simple and practical manner and so that any required adjustment may be easily performed. The measuring instrument may be attached, for instance, to one of the beams or bridging members, and the other beam or bridging member may be provided with a screw-threaded or otherwise adjustable pin which cooperates with a feeler member or other movable member of the measuring instrument. This instrument may be located outside the body and may be provided with a bracket or supporting member which passes through a side opening in the tubular wall of the body into the axial bore therein and is attached to one of the said beams or bridging members.

The accompanying drawings illustrate by way of example two constructional forms of the invention. Figs. 1 and 2 show one embodiment of the measuring apparatus in axial section and viewed from above in Fig. 1, respectively, and Fig. 3 shows a second constructional form in axial section taken along a plane which is perpendicular to the sectional plane in Fig. 1.

The measuring apparatus shown in Figs. 1 and 2 consists of a steel body 1 which is provided with an axial hole or bore which passes entirely through the body and which is thus open at both ends thereof, so that the body has the shape of a thick-walled tube having plane end surfaces. The central portion of the body is recessed at 2 so that said portion of the body has a smaller cross sectional area than the remainder of the body. At each end of the body there is provided a cross beam or bridging member 3 and 4, respectively. In the constructional form shown in Figs. 1 and 2, each such member 3 and 4 is provided with a central cup-shaped portion which is positioned in the axial hole or bore in the body, and which is provided with three radially extending arms 5 which are positioned in corresponding recesses 6 in the end surfaces of the body 1. As shown in the drawing, there are clearances between the surfaces of the body 1 and all adjoining surfaces on the bridge members 3 and 4. The outer ends of the arms 5 are preferably located at equal radial distances from the axis of the body 1, and each of said ends is supported by a pin 7 to which it is attached, in the instance illustrated, by means of a screw. The pins 7 extend from the arms 5 in a direction parallel to the axis of the body 1 inwards towards the central cross sectional plane of the body 1. The pins 7 project into corresponding bores 8 in the tubular wall of the body, having larger diameters than the pins to provide clearances between the pins and the walls of the bores, and the inner ends of the pins 7 are provided with smaller pins 9 which are inserted in corresponding holes 10 in the tubular wall. The inner ends of the pins 7 abut against the bottoms of the bores 8 which form abutments for the pins. Consequently, each bridge member 3 and 4 is supported in the body 1 exclusively at the said abutments or bottom surfaces of the bores 8 by the intermediary of the pins 7. This means of supporting the bridging members ensures a capability of movement of the bridging members 3 and 4, on the one hand, relatively to the body 1, on the other hand, sufficient to prevent the said members 3 and 4 from being appreciably influenced by changes of dimension in the cross direction of the body 1 when the latter is compressed.

As previously mentioned, the bridging members 3 and 4 serve to transmit the change of dimension suffered by the body 1 when subjected to the action of a force in the axial direction of the body, to a measuring instrument which must, therefore, be interposed in a suitable manner between the center points of the bridging members 3 and 4, which points lie on the axis of the body 1. In the constructional form shown in Figs. 1 and 2, the measuring instrument 11 which may be of any desired and suitable type, and which, therefore, is not particularly described, is partly located outside the body 1 so that the pointer of the instrument is visible from the outside of the body. The measuring instrument 11 is provided with an arm or bracket 12 attached to the casing of the instrument and extending through an opening or bore 13 in the tubular wall of the body 1 into the axial hole or bore thereof, where it is attached by means of screws to the lower bridge member 4. The feeler member of the measuring instrument consists of a movable arm 14 which is connected to the pointer, not shown, of the instrument and is provided with a feeler projection 15. The upper bridge member 14 is provided with a sleeve 16 forced into an axial hole in said member and provided with interior screw threads into which a screw 17 is screwed which is provided with an extension in the form of a stem 18 the lower end of which is adapted to cooperate with the feeler projection 15. For adjusting the measuring instrument in zero position, the screw 17 is connected to a knob or handwheel 19 outside the body 1 by means of a worm gear 20, 21 so that the screw 17 may be turned by means of said handwheel to adjust the pointer of the measuring instrument in zero position.

When a force or pressure is to be measured by means of the measuring apparatus above described, the apparatus is placed in such manner that the force is allowed to act on the body 1 in the axial direction thereof by the intermediary of suitable pressure pads or the like applied to the end surfaces of the body. The force produces a certain compression of the body 1 which results in a certain change of dimension of the body in its axial direction. Since the bridge members 3 and 4 follow the body in this movement of compression thereof, the change of dimension will be transmitted through the stem 18 to the measuring instrument, which indicates the amount of the change of dimension, that is to say, in the present case, the change of the length between the abutment surfaces for the pins 7 at the bottoms of the bores 8. If such change of length is not exactly equal at all points around the tubular wall of the body 1, i. e. in the present case, at all three points of support of the bridge members 3 and 4, then the measuring instrument will indicate the mean value of the changes of length at the said points. On the other hand, due to the means of supporting the bridge members 3 and 4 above described, other changes of shape of the body 1 than the change of length thereof will have practically no influence on the said members 3 and 4. According to the present invention, therefore, it is practically entirely ensured that the changes of length of the body 1 will stand in a linear and univocal relation to the force or pressure acting on the body 1. Due to the body 1 having a less cross sectional area at the central portion 2 intermediate the abutment surfaces for the bridging members 3 and 4 at the bottoms of the bores 8 than at the remaining portions of the body, the result is attained that the said intermediate portion becomes relatively more compressed and thus suffers a comparatively greater change of dimension in the axial direction than the other portions of the body.

In the constructional form illustrated in Fig. 3, the same reference numerals as in Figs. 1 and 2 are used for similar or corresponding parts. This constructional form differs from that above described mainly in that the two bridging members 3 and 4 lack in this case the above-mentioned arms 5. In place thereof the cup-shaped portions of the bridging members 3 and 4 bear directly against annular shoulders 22 and 23, respectively, which are formed by bores at the ends of the body 1 of larger diameters than that of the through axial bore. Tension screw springs 24, 25 are interposed between the two bridging members 3 and 4 and serve to maintain said members bearing against the said shoulders 22, 23. In other respects the measuring apparatus shown in Fig. 3 is constructed in substantially the same manner as that above described in connection with Figs. 1 and 2, and it will be easily understood that it operates in substantially the same manner.

We claim:

1. A measuring apparatus for measuring high pressures or forces, comprising in combination a substantially tubular body of a resistant and elastic material having an axial hole passing entirely through said body from one end to the other end thereof and having a second hole in a direction substantially transverse to the axis of said body and leading from the axial hole therein through the wall of said body to the circumferential surface thereof, said body being adapted to be subjected in its axial direction to the action of the pressure or force to be measured, bridge members at the ends of said body positioned inside the end surfaces thereof in the transverse direction to the axis of said body, abutment surfaces for supporting said bridge members located in the tubular wall of said body at points spaced from one another in the axial direction of said body, a length measuring instrument positioned outside said body, a bracket secured to one of said bridge members at one end of said body and extending through said transverse hole in said body and supporting said measuring instrument outside said body, said measuring instrument having a feeler member extending through said transverse hole into said axial hole in said body, and an adjustment stem located in the axis of said body and adjustably attached to the bridge member at the other end of said body so as to be adjustable in the axial direction of said body, said adjustment stem cooperating with said feeler member of said measuring instrument.

2. A measuring apparatus as defined in claim 1, further comprising pins extending substantially parallel to the axis of the body and interposed between the bridge members and the abutment surfaces in the body.

3. A measuring apparatus for measuring high pressures or forces, comprising in combination a substantially tubular body of a resistant and elastic material having an axial hole passing entirely through said body from one end to the other thereof, said body having two end portions and having a middle portion subject to compressive deformation by the application of the pressures or forces to be measured to the end surfaces of said body, a set of three abutment surfaces disposed substantially equidistantly from each other and from the axis of said body and located toward one end of said middle portion, a similar set of three abutment surfaces located toward the other end of said middle portion, each of said abutment surfaces constituting the bottom of a bore which extends inwardly from an end surface of said body and in a direction substantially parallel to the axis of said body, spacer members disposed in each of said bores and engaging said abutment surfaces, bridge members supported by each set of spacer members and serving to bridge said axial hole, said bridge members being disposed entirely within the confines of said end surfaces, said spacer members being of a diameter less than that of said bores to provide a clearance on all sides of said spacer members so as to permit relative transverse movement of the outer ends of said spacer members with respect to said end portions of the body thus providing substantially frictionless transverse movement of said bridge members with respect to said end portions, and indicating means disposed at least partially within said axial hole and responsive to the changes in distance between the central portions of said bridge members.

4. A measuring apparatus for measuring high pressures or forces, comprising in combination a substantially tubular body of a resistant and elastic material having an axial hole passing entirely through said body from one end to the other thereof, said body having two end portions and having a middle portion subject to compressive deformation by the application of the pressures or forces to be measured to the end surfaces of said body, a set of three abutment surfaces disposed substantially equidistantly from each other and from the axis of said body and located toward one end of said middle portion, a similar set of three abutment surfaces located toward the other end of said middle portion, each of said abutment surfaces constituting the bottom of a bore which extends inwardly from an end surface of said body and in a direction substantially parallel to the axis of said body, spacer members disposed in each of said bores and engaging said abutment surfaces, bridge members supported by each set of spacer members and serving to bridge said axial hole, said bridge members being disposed entirely within the confines of said end surfaces, said spacer members being of a diameter less than that of said bores to provide a clearance on all sides of said spacer members so as to permit relative transverse movement of the outer ends of said spacer members with respect to said end portions of the body thus providing substantially frictionless transverse movement of said bridge members with respect to said end portions, a length measuring instrument attached to one of said bridge members at one end of said body, said measuring instrument having a feeler member located on the axis of said body, and an adjustment stem located axially of said body and adjustably attached to the bridge member at the other end of said body so as to be adjustable in the axial direction of said body, said adjustment stem cooperating with said feeler member of said measuring instrument.

5. A measuring apparatus for measuring high pressures or forces, comprising in combination a substantially tubular body of a resistant and elastic material having an axial hole passing entirely through said body from one end to the other thereof, said body having two end portions and having a middle portion subject to compressive deformation by the application of the pressures or forces to be measured to the end surfaces of said body, a set of three abutment surfaces disposed substantially equidistantly from each other and from the axis of said body and located toward one end of said middle portion, a similar set of three abutment surfaces located toward the other end of said middle portion, each of said abutment surfaces constituting the bottom of a bore which is located in the wall of said tubular body at a point substantially midway between the surface of said axial hole and the outer circumferential surface of said body and extends inwardly from an end surface of said body and in a direction substantially parallel to the axis of said body, spacer members disposed in each of said bores and engaging said abutment surfaces, bridge members supported by each set of spacer members and serving to bridge said axial hole, said bridge members being disposed entirely within the confines of said end surfaces, said spacer members being of a diameter less than that of said bores to provide a clearance on all sides of said spacer members so as to permit relative transverse movement of the outer ends of said spacer members with respect to said end portions of the body thus providing substantially frictionless transverse movement of said bridge members with respect to said end portions, and indicating means disposed at least partially within said axial hole and responsive to the changes in distance between the central portions of said bridge members.

6. A measuring apparatus for measuring high pressures or forces, comprising in combination a substantially tubular body of a resistant and elastic material having an axial hole passing entirely through said body from one end to the other thereof, said body having two end portions and having a middle portion subject to compressive deformation by the application of the pressures or forces to be measured to the end surfaces of said body, a set of three abutment surfaces disposed substantially equidistantly from each other and from the axis of said body and located toward one end of said middle portion, a similar set of three abutment surfaces located toward the other end of said middle portion, each of said abutment surfaces constituting the bottom of a bore which extends inwardly from an end surface of said body and in a direction substantially parallel to the axis of said body, pins disposed in each of said bores and engaging said abutment surfaces, said pins having a substantial length relatively to their diameter, bridge members supported by each set of pins and serving to bridge said axial hole, said bridge members being disposed entirely within the confines of said end surfaces, said pins being of a diameter less than that of said bores to provide a clearance on all sides of said pins so as to permit substantially frictionless transverse movement of said pins and said bridge members with respect to said end portions, each of said pins having at its inner end a reduced portion forming a dowel pin inserted in a hole at the bottom of the bore in which such pin is disposed to secure such pin to said body, means securing the outer ends of said pins to the associate bridge members, and indicating means disposed at least partially within said axial hole and responsive to the changes in distance between the central portions of said bridge members.

CARL GUSTAF HÅRD af SEGERSTAD.
JOHN-ERIK MAGNUSSON.

REFERENCES CITED

The following references are of record in the file of this patent:

UNITED STATES PATENTS

| Number | Name | Date |
|---|---|---|
| 1,650,789 | Doolittle | Nov. 29, 1927 |
| 2,276,843 | Hathaway | Mar. 17, 1942 |

FOREIGN PATENTS

| Number | Country | Date |
|---|---|---|
| 445,345 | Germany | June 3, 1927 |
| 879,294 | France | Nov. 19, 1942 |